United States Patent [19]
Hanssen

[11] 3,757,399
[45] Sept. 11, 1973

[54] ROLLER FOR REMOVING FOLDS FROM MATERIAL IN FILM OR WEB FORM

[75] Inventor: Pierre J. Hanssen, Schweighouse, France

[73] Assignee: P. Hanssen & Cie S.A., Bas-Rhin, France

[22] Filed: Dec. 7, 1971

[21] Appl. No.: 205,525

[30] Foreign Application Priority Data
Dec. 16, 1970 France .............................. 7045930

[52] U.S. Cl. .............................................. 29/116 R
[51] Int. Cl. .............................................. B21b 13/02
[58] Field of Search ........................ 29/113 R, 116 R, 29/116 AD, 130

[56] References Cited
UNITED STATES PATENTS

| 2,960,753 | 11/1960 | Robertson | 29/116 R X |
| 3,543,365 | 12/1970 | Helminen | 29/113 R |
| 3,562,882 | 2/1971 | Widmer et al. | 29/116 R X |
| 3,406,438 | 10/1968 | Reilly | 29/116 R |
| 3,512,475 | 5/1970 | Justus et al. | 29/116 R X |
| 3,039,370 | 6/1962 | King et al. | 29/113 R X |
| 3,095,634 | 7/1963 | Williams et al. | 29/113 R |
| 3,094,771 | 6/1963 | Robertson | 29/116 AD |
| 3,500,524 | 3/1970 | Jagminas | 29/116 R |

Primary Examiner—Alfred R. Guest
Attorney—Robert E. Burns et al.

[57] ABSTRACT

A roller for removing folds from web material has an outer tube part mounted at each extremity by end bearings on a central curved shaft. An oil-resistant elastic polymer sleeve spaced from but surrounding the shaft has an outer surface applied against the inner surface of the tube part. The inner surface of the sleeve is applied against the outer races of ball bearings disposed at intervals along the shaft between the end bearings. Opposite ends of the sleeve are clamped to the end bearing, and the space between the sleeve and shaft contains lubricating oil.

8 Claims, 2 Drawing Figures

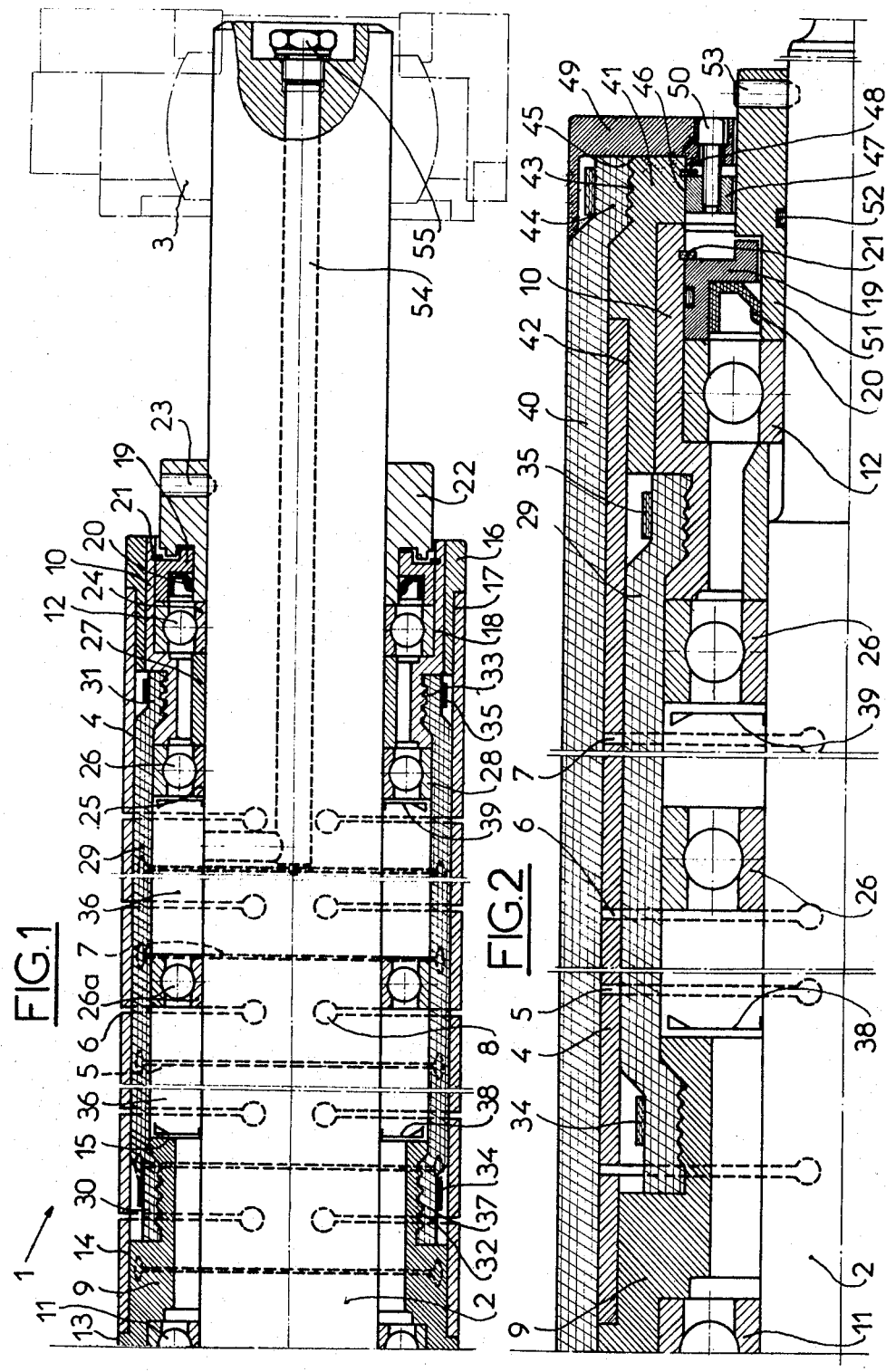

ROLLER FOR REMOVING FOLDS FROM MATERIAL IN FILM OR WEB FORM

The invention relates to a roller for removing folds from films or material in the form of fibrous, cellulosic, metallic and plastics webs and generally any material in the form of a web.

Rollers for removing folds are already known. One of these known rollers comprises a shaft, provided with bearing cages on the extended part located inside a tube made flexible by a series of transverse incisions. These cages are constituted by ball bearings and by supports for the latter formed by a flanged race fixed to the shaft and by the bearing which is in contact with the inside of the tube by means of another race, the outer surface of which is slightly curved and constituted by a ring of flexible material. If the flexible tube is covered by a sheath of flexible material, the latter is kept in place on the tube by rings. At its ends, the flexible tube comprises bearings provided with ball bearings.

Rollers are also known comprising the same members as above-described, but the tube is a curved sleeve pivoting about a curved shaft. In addition, the sleeve periphery is formed with a plurality of oblique grooves. These grooves are divided into two series of grooves, the axis of each groove forming a certain angle relative to the direction of feed of the film. The two series are divergent, which causes a slight widening-out or widthwise spreading of the film, and accentuates the effect already obtained by the curve of the roller for removing folds. Each groove is composed of two oblique incisions provided with a circular aperture. The grooves of each series are equidistant and preferably parallel to each other. Two grooves located in the same plane perpendicular to the curved shaft but obliquely relative to the direction of feed of the film, start from two diametrically opposed points. The film adheres to the edges of the oblique grooves and, due to the helical unwinding action of these edges, the film tends to deviate from the direction of feed.

These known fold removing rollers have several disadvantages. For the correct operation of the ball bearings, these parts have to be lubricated correctly. Nevertheless, the feeding speed of the film is continually being increased. Due to this fact, it is necessary to lubricate the ball bearings with oil. In fact, at high speeds of rotation, lubrication with oil is much more appropriate than with grease, but has not been possible hitherto. In the case of rollers for removing folds formed in accordance with the invention, as herebelow set forth, lubrication by means of an oil bath can be used and due to the stirring of the oil, good lubrication of the ball-bearing can be obtained automatically.

Due to the relatively low viscosity of the lubricant, it is necessary to provide good fluid-tightness so as to retain the oil.

An object of the invention is to obviate or substantially obviate the above described disadvantages observed in known rollers and provide a roller for removing folds, utilising a new conception of mounting and lubrication of ball bearings to permit the curved roller or the segments of curved roller to rotate easily at high speed, by assuring that it can be continuously lubricated in an oil bath. Thus the running speed of the film can be increased and the installation made more profitable.

For this purpose, there is provided according to the invention a roller assembly for bearing means including removing folds from films or material in the form of fibrous, cellulosic, metallic and plastics webs and generally any material in the form of a web, said roller comprising a curved shaft serving as a support for end bearings and intermediate bearings, said bearings being provided with ball bearings located inside a rigid outer sleeve having axially spaced regions circumferentially thereof thereby defining a flexible tube or sleeve and/or segments of tube, at least one fluid tight flexible inner sleeve, of elastic polymer resistant to lubricating oils located between the outer flexible tube or segments and the bearings, said sleeve being held at its ends by sealing means including clamping-bands firmly applying said ends in undulating grooves provided in the end bearings and/or intermediate bearings, and said sleeve enclosing the ball bearings placed between the various bearings.

The invention will be further described by way of example with reference to the accompanying drawing in which:

FIG. 1 is an axial sectional view of part of a roller for removing folds, formed according to the invention, comprising a flexible, metallic external tube, and FIG. 2 is an axial, sectional view, on a larger scale, of part of a roller for removing folds formed according to the invention, comprising an outer elastic cover.

Referring to FIG. 1, the roller for removing folds 1 comprises a shaft 2 held at its ends by a bearing 3. This shaft 2 is, in reality, curved, but in order to simplify the drawing, it has been shown rectilinear. This shaft 2 serves as a support for a flexible metallic tube or tube segments 4. The flexibility of the tube 4 is imparted to it by grooves 5, 6, 7, which may be either oblique, or transverse relative to the generatrix of the flexible tube or tube segments 4. Each groove 5, 6, 7, is provided at its ends with a circular aperture 8.

Two tubular bearings 9 and 10 comprising ball bearings 11 and 12 respectively are provided between the ends of the flexible tube or tube segments 4 and the shaft 2. The diameter of an outer surface 13 of the bearing 9 corresponds to the outer diameter of the roller 1 for removing folds. This bearing 9 comprises a first step 14 which makes it possible to laterally engage one end 15 of the bearing 9 inside one end of the flexible tube or tube segments 4. At the other end of the tube, where the other bearing 10 is located, a cover 16 is provided covering the bearing 10 and comprising a step 17 engaged in the tube or segments 4, to retain it or them laterally.

A housing 18 is provided in the bearing 10 in which there is inserted, on the one hand, the ball bearing 12 and, on the other hand, a retaining ring 19 provided with at least one seal 20. The retaining ring 19 and the ball bearing 12 are held in place by a stop ring 21 housed in a groove provided in the bore of the bearing 10. A stop collar 22, held in place on the shaft 2 by a radial grub screw 23 with a pointed end, comes to bear against the inner race 24 of the ball-bearing 12. A spacing piece 27 is provided between the inner race 24 of the ball bearing 12 and an inner race 25 of an intermediate ball bearing. The outer race 28 of this ball bearing 26 abuts against the end bearing 10. Another intermediate bearing 26a is mounted on the shaft 2 between the two bearings.

Between the bearings 9 and 10 there is provided a fluid-tight sleeve 29 of elastic polymer such as, for example, PERBUNAN (Trade Mark) which corresponds to neoprene, a type of elastomers base on polymers, which is resistant to lubricating oils. The ends 30 and 31 of the sleeve 29 are located in grooves 32 and 33 formed respectively in the outer surfaces of the bearings 9 and 10. By means of bands 34 and 35 clamping the ends of the sleeve 29 in the grooves 32 and 33, the fluid-tight sleeve 29 is kept in place. In order that the ends 30 and 31 be well retained, the bases of the grooves 32 and 33 have an undulated shape 37, which increases the contact surface between the members which are face to face. Moreover a good seal is ensured at these locations.

Chambers 36 defined between the shaft 2 and the fluid-tight sleeve 29 are thus obtained. Lubricating oil may circulate in these chambers, the oil being introduced thereinto through an axial bore 54 provided in the shaft 2. After being filled with oil, this bore is stopped up by a plug 55. Stirring means including deflectors 38 and 39 are provided near the bearings 9 and 10 to ensure good distribution of the oil.

The roller for removing folds illustrated in FIG. 2 is almost identical to that described with reference to FIG. 1. In FIG. 2 the flexible metal tube 4, identical to that in FIG. 1, is covered by an elastic cover 40. The grooves 5, 6 and 7 remain in order to retain the flexibility of the tube/cover arrangement. In order to retain this elastic cover 40, it is necessary to modify the end of the roller.

The cover 16 (FIG. 1) is replaced by a sleeve 41 (FIG. 2.). The latter comprises on its outer periphery a left-hand step 42 for the end of the metal tube 4, and a second right-hand step 43 serving as a support for an end 44 of the elastic cover 40. This step 43 is provided with transverse undulations 45 which make it possible to strengthen the securement of the end 44 of the elastic cover 40. The sleeve 41 comprises a narrow part 46 in which a clamping ring 47 is inserted, held in place by a stop ring 48. A cover 49, covering the end of the roller for removing folds, is made integral with the latter by fixing screws 50 screwed into the clamping ring 47. The ring 51, provided with a seal 52, is held in place by a grub screw 53 with a pointed end. This ring 51 has the same function as the ring 22 (FIG. 1), and has practically the same form.

In order to centre and clamp the various ball bearings correctly, it is necessary that the arrangement, composed of the shaft, the ball bearings and the fluid-tight sleeves is tightly mounted in the flexible tube or tube segments.

For this purpose, a vacuum is initially established in the fluid-tight sleeve 29, mounted with its shaft and the ball bearings. This causes the fluid-tight sleeve 29 to be pressed against the shaft 2. Due to the traction thus exerted, the thickness of the fluid-tight sleeve 29 is decreased at the location of the ball bearings. This operation makes it possible to pass the flexible tube 4 over the shaft and ball bearings without forcing the tube. When air is again allowed to enter the fluid-tight sleeve 29, the latter reassumes its initial position and original thickness, which assures a good retention of the ball bearings in the flexible tube 4.

Although the invention has been described with regard to a particular embodiment, it is understood that it is in no way limited and that various modifications of form and material can be applied without diverging from the frame and spirit of the invention.

What is claimed is:

1. A roller assembly for removing folds from a moving web of material during use comprising: an elongated rigid shaft having a set curvature; a flexible inner sleeve comprising oil resistant material circumferentially enclosing said shaft and spaced therefrom; bearing means disposed between said shaft and said inner sleeve rotatably mounting said inner sleeve about the longitudinal axis of said shaft and defining in conjunction with said shaft and said inner sleeve a reservoir receptive of an oil lubricant therein for lubricating said bearing means; sealing means including said inner sleeve cooperative with said bearing means for fluid tightly sealing said reservoir outwardly of the bearing means to define a closed lubrication reservoir in communication with said bearing means; and a rigid outer sleeve fixedly mounted circumferentially about and in intimate contact with said inner sleeve having therein axially spaced regions circumferentially thereof permitting deformation with respect to the longitudinal axis thereof and having an outer surface for engaging a moving web of material during use of the roller assembly.

2. A roller assembly according to claim 1, wherein said bearing means comprises a bearing disposed at each end portion of said inner sleeve and at a center portion thereof.

3. A roller assembly according to claim 1, comprising stirring means mounted in said reservoir for stirring the lubricant therein.

4. A roller assembly according to claim 3, wherein said stirring means comprises deflectors for stirring said lubricant.

5. A roller assembly according to calim 1, wherein said shaft has means therein defining a passage in communication with said reservoir and receptive of a lubricant therein.

6. A roller assembly according to claim 1, wherein said inner sleeve comprises an elastomer.

7. A roller assembly according to claim 6, wherein said elastomer comprises "PERBUNAN."

8. A roller assembly according to claim 1, further comprising elastic sleeve covering said outer sleeve.

* * * * *